(12) United States Patent
Januszewski et al.

(10) Patent No.: US 9,894,620 B2
(45) Date of Patent: Feb. 13, 2018

(54) TRANSMISSION POWER CONTROL OF USER EQUIPMENT COMMUNICATING WITH LOW POWER BASE STATION AND HIGH POWER BASE STATION

(71) Applicant: Nokia Solutions and Networks Oy, Espoo (FI)

(72) Inventors: Maciej Januszewski, Pila (PL); Roman Maslennikov, Nizhny Novgorod (RU); Alexey Trushanin, Nizhny Novgorod (RU); Maxim Vechkanov, Balakhna (RU); Vyacheslav Shumilov, Nishny Novgorod (RU); Marcin Rybakowski, Rawicz (PL)

(73) Assignee: Nokia Solutions and Networks Oy, Espoo (FI)

( * ) Notice: Subject to any disclaimer, the term of this patent is extended or adjusted under 35 U.S.C. 154(b) by 255 days.

(21) Appl. No.: 14/681,175

(22) Filed: Apr. 8, 2015

(65) Prior Publication Data
US 2015/0289212 A1    Oct. 8, 2015

(30) Foreign Application Priority Data

Apr. 8, 2014    (EP) .................................... 14163840

(51) Int. Cl.
*H04W 52/24*    (2009.01)
*H04W 72/04*    (2009.01)
(Continued)

(52) U.S. Cl.
CPC ......... *H04W 52/243* (2013.01); *H04W 52/08* (2013.01); *H04W 52/146* (2013.01);
(Continued)

(58) Field of Classification Search
CPC .................................................. H04W 52/243
See application file for complete search history.

(56) References Cited

U.S. PATENT DOCUMENTS 5,884,187 A * 3/1999 Ziv ..................... H04W 52/143
455/442
6,069,883 A * 5/2000 Ejzak .................... H04W 28/22
370/335

(Continued)

FOREIGN PATENT DOCUMENTS

WO    WO 03/067783 A2    8/2003

OTHER PUBLICATIONS

RP-121436, "Proposed SID: Study on UMTS Heterogeneous Networks", Huawei, HiSilicon, Qualcomm Incorporated, Ericsson, ST-Ericsson, Telecom Italia, Teliasonera, Orange, Telefonica, Nokia Siemens Networks.

(Continued)

*Primary Examiner* — Andrew Lai
*Assistant Examiner* — Andrew C Lee
(74) *Attorney, Agent, or Firm* — Harrington & Smith

(57) ABSTRACT

There is provided improved interference control of uplink transmissions, when user equipment is communicating with at least two base stations in a communications network. A threshold is defined for a difference of the determined allowed transmission power to an allowed transmission power for the user equipment to a second base station of the at least two base stations. It is determined whether the determined allowed transmission power to the first base station meets the defined threshold. Transmission rate of relative power control commands from at least one of the base stations is changed, when the threshold is met.

18 Claims, 8 Drawing Sheets

(51) Int. Cl.
  *H04W 52/08* (2009.01)
  *H04W 52/14* (2009.01)
  *H04W 52/60* (2009.01)
  *H04W 52/40* (2009.01)
  *H04W 52/50* (2009.01)

(52) U.S. Cl.
  CPC ......... *H04W 52/244* (2013.01); *H04W 52/60* (2013.01); *H04W 72/0473* (2013.01); *H04W 52/241* (2013.01); *H04W 52/245* (2013.01); *H04W 52/40* (2013.01); *H04W 52/50* (2013.01)

(56) References Cited

U.S. PATENT DOCUMENTS

| | | | | |
|---|---|---|---|---|
| 6,085,108 | A * | 7/2000 | Knutsson | H04B 7/022 455/522 |
| 6,154,659 | A * | 11/2000 | Jalali | H04W 52/24 455/522 |
| 6,405,021 | B1 * | 6/2002 | Hamabe | H04W 52/362 370/318 |
| 6,411,817 | B1 * | 6/2002 | Cheng | H04W 52/20 370/318 |
| 6,643,520 | B1 * | 11/2003 | Park | H04W 52/50 455/13.4 |
| 6,977,967 | B1 * | 12/2005 | Tiedemann, Jr. | H04W 52/08 375/297 |
| 8,331,942 | B2 * | 12/2012 | Usuda | H04W 36/18 455/442 |
| 8,396,505 | B2 * | 3/2013 | Nakamura | H04W 52/242 370/335 |
| 8,452,316 | B2 * | 5/2013 | Sutivong | H04L 1/0045 370/334 |
| 8,700,083 | B2 * | 4/2014 | Yavuz | H04W 52/244 370/318 |
| 8,744,362 | B2 * | 6/2014 | Kawahatsu | H04L 1/0003 455/443 |
| 9,319,997 | B2 * | 4/2016 | Mohan | H04W 52/244 |
| 2003/0078067 | A1 * | 4/2003 | Kim | H04W 52/146 455/522 |
| 2004/0087327 | A1 * | 5/2004 | Guo | H04W 52/367 455/522 |
| 2006/0019694 | A1 * | 1/2006 | Sutivong | H04W 52/24 455/522 |
| 2007/0263585 | A1 * | 11/2007 | Duan | H04W 28/02 370/342 |
| 2008/0032725 | A1 * | 2/2008 | Usuda | H04L 1/0002 455/509 |
| 2008/0062925 | A1 * | 3/2008 | Mate | H04W 52/244 370/331 |
| 2009/0042596 | A1 * | 2/2009 | Yavuz | H04W 52/40 455/522 |
| 2009/0047916 | A1 * | 2/2009 | Haykin | H04L 5/0037 455/115.1 |
| 2009/0086861 | A1 * | 4/2009 | Yavuz | H04W 52/367 375/346 |
| 2010/0329132 | A1 * | 12/2010 | Raghothaman | H04W 52/325 370/252 |
| 2011/0021197 | A1 * | 1/2011 | Ngai | H04W 36/30 455/436 |
| 2011/0217974 | A1 * | 9/2011 | Naka | H04B 1/707 455/423 |
| 2012/0202554 | A1 * | 8/2012 | Seo | H04W 52/146 455/522 |
| 2012/0213092 | A1 | 8/2012 | Sun et al. | |
| 2012/0224555 | A1 * | 9/2012 | Lee, II | H04W 52/143 370/329 |
| 2012/0258746 | A1 * | 10/2012 | Tokgoz | H04J 11/0059 455/501 |
| 2013/0136042 | A1 * | 5/2013 | Chan | H04W 52/08 370/310 |
| 2014/0044056 | A1 * | 2/2014 | Chen | H04W 72/04 370/329 |
| 2014/0080529 | A1 * | 3/2014 | Mohan | H04W 52/244 455/501 |
| 2015/0092670 | A1 * | 4/2015 | Makhlouf | H04W 52/265 370/329 |

OTHER PUBLICATIONS

R1-125312, "TP on Simulation Assumptions for Study on HSPA Heterogeneous Networks", Huawei, HiSilicon, RAN1 #71.
R1-133776, "E-DCH Decoupling Results in HetNet Environment", NSN, RAN1 #74.

* cited by examiner

TRANSMISSION POWER CONTROL OF USER EQUIPMENT COMMUNICATING WITH LOW POWER BASE STATION AND HIGH POWER BASE STATION

FIELD

The present invention relates to transmission power control of user equipment and more particularly to transmission power control of user equipment communicating with a low power base station and a high power base station.

BACKGROUND

Wireless data traffic has been increasing on wireless communication networks as the amount of data services that use the wireless communication network has increased. More users are using wireless communication devices that have a high demand for data. To boost system capacity and enhance coverage performance heterogeneous network (HetNet) deployments may be implemented.

A HetNet may refer to a wireless communication network that may use multiple types of access nodes in a wireless network. Each node may include one or more cells. The HetNet can use macrocells and small cells (e.g., picocells, femtocells, and/or WiFi network elements) to offer coverage in a wireless communication network. The coverage area of the macrocell may include or overlap with the coverage area of a small cell. Small cells may enable a user device to receive data at increased data rates depending on the location of the user device within the service areas.

Implementation of a HetNet in a wireless communication network may be complex and/or inefficient. As a HetNet may have multiple cells communicating within a coverage area, communications from the cells may cause interference. On the other hand a wireless terminal in the coverage area of the HetNet and communicating with a macrocell may cause interference to small cells, since the wireless terminal typically needs a higher transmission power for communications in the macrocell than in the small cells due to DL-UL imbalance effect. Accordingly, interference control in the communication network may become particularly difficult due to the variety of different types of cells in the HetNet.

BRIEF DESCRIPTION

An object to the invention is to provide a solution to at least part of the above disadvantages. The object is achieved by an apparatus, a method and a computer program product which are characterized by what is stated in the independent claims. The preferred embodiments of the invention are disclosed in the dependent claims.

According to an aspect there is provided a method comprising determining an allowed transmission power for user equipment to a first base station of at least two base stations communicating with the user equipment in a communications network, defining a threshold for a difference of the determined allowed transmission power to an allowed transmission power for the user equipment to a second base station of the at least two base stations, determining whether the determined allowed transmission power to the first base station meets the defined threshold, and causing to change a transmission rate of relative power control commands from at least one base station of the base stations, when the threshold is met.

According to an aspect there is provided an apparatus comprising a power control unit for controlling transmission power of user equipment communicating to at least two base stations in a communications network, and an interface unit for communicating power control information between the user equipment and the base stations, wherein the power control unit is operatively connected to the interface unit and arranged to cause determining allowed transmission power for the user equipment to a first base station of the at least two base stations, defining a threshold for a difference of the determined allowed transmission power to an allowed transmission power for the user equipment to a second base station of the at least two base stations, determining whether the determined allowed transmission power to the first base station meets the defined threshold, and cause to change a transmission rate of relative power control commands from at least one base station of the base stations, when the threshold is met.

According to an aspect there is provided a computer program embodied on a non-transitory computer readable storage medium, the computer program being configured to control a processor to perform a method according to an aspect. According to an aspect there is provided a computer program product comprising executable code that when executed, cause execution of functions of a method according to an aspect.

Some aspects provide improvements comprising improved interference control of uplink transmissions when user equipment is communicating with various types of cells/base stations in a communications network.

BRIEF DESCRIPTION OF THE DRAWINGS

Embodiments of the present invention are described below, by way of example only, with reference to the accompanying drawings, in which.

DETAILED DESCRIPTION OF SOME EMBODIMENTS

Figure 1A:
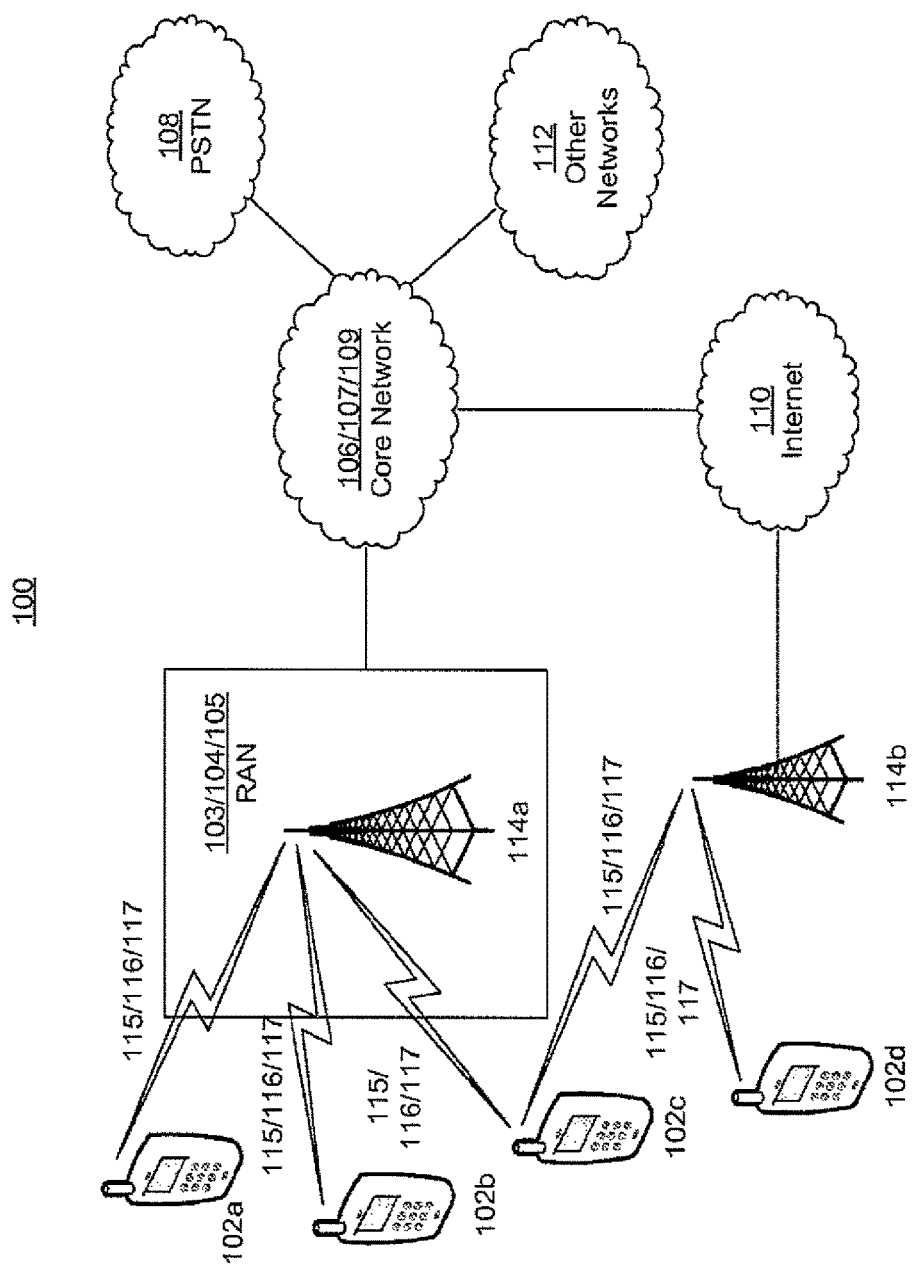
FIG. 1A is a system diagram of an example communication system in which one or more disclosed embodiments may be implemented.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Various embodiments described herein provide interference control in a wireless communication network. The wireless communication network may be a heterogeneous network (HetNet), which may implement multiple types of nodes. In a HetNet, a wireless transmit/receive unit (WTRU) may perform network communications using a macrocell and/or a small cell e.g. a picocell or a femtocell. The WTRU may receive downlink communications and/or transmit uplink communications to one or more cells in the communication network. Interference control may be performed, as described herein, relating to uplink communications in the communications network. The macrocell may be provided by a high power base station and the small cell may be provided by a low power base station.

Transmission power may be adjusted for network communications to overcome interference. Measurements may be performed at each cell to determine a power adjustment for an uplink channel. A measurement may be performed by a serving cell and a non-serving cell. A serving base station is the base station controlling the serving cell, and a non-serving base station is the base station controlling the non-serving cell. The connection to the communications network of the WTRU is controlled by the serving cell. The WTRU communicates with the serving cell in uplink and/or downlink directions. The communications may comprise data and/or control information. The non-serving cell contributes to the communications of data and/or control information for the WTRU but has less control possibilities than serving cell. The serving and non-serving cells are located at least partly within the same service area. The measurements may include a pathloss, received signal code power (RSCP), a received signal strength indication (RSSI), a chip-level signal-to-noise ratio (Ec/No), a chip-level signal-to-interference ratio (Ec/Io), and/or another quantity that may indicate signal quality. A power adjustment for an uplink channel may be determined based on a difference between the measurements. Measurements may be performed independently for each uplink channel for adjusting the transmission power. The power adjustment may be a power increase, a power decrease or maintaining the power applied to the control channel of the serving cell, for example.

Various embodiments described herein are based on the idea that timing of the power control commands from base stations for controlling WTRU transmission power is adjusted such that changes of the transmission power may be effected in the WTRU and detected by the base stations before further adjustments to the transmission power of the WTRU are made. In this way in a communication network such as the HetNet, where various kinds of cells exist, interference caused by uplink transmissions may be avoided or at least reduced.

In the followings large cells, e.g. a macrocell, and base stations that have a large coverage area may be referred to as high power base stations due to the high transmission power required to provide the coverage area. Similarly small cells, e.g. picocells, femtocells, and/or WiFi network elements, and base stations that have a small coverage area may be referred to as low power base stations due to transmission power required to provide the coverage area being smaller than the transmission power of the high power base stations.

It should be appreciated that the various embodiments described herein may be applied to base stations and cells that have service areas and/or transmission power capabilities that are substantially the same. Accordingly, although some embodiments are described by reference to a cell sizes, e.g. macro or smaller cells, or by reference to transmission power capability of base stations, e.g. a high power or a low power base station, the embodiments may be employed also to base stations or cells that have substantially the same service area and/or transmission power capability. Substantially the same service areas may be provided by base stations that are of the same configuration, e.g. the base stations are of the same type.

FIGS. 1A-1D are diagrams of example systems and/or apparatuses on which the embodiments described herein may be performed. FIG. 1A is a diagram of an example communication system 100 in which one or more disclosed embodiments may be implemented. The communication system 100 may be a multiple access system that provides content, such as voice, data, video, messaging, broadcast, etc., to multiple wireless users. The communication system 100 may enable multiple wireless users to access such content through the sharing of system resources, including wireless bandwidth. For example, the communication systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 1A, the communication system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communication systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and/or the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link {e.g., radio frequency (RF), microwave, infrared (IR), ultraviolet (UV), visible light, etc.). The air interface 115/116/117 may be established using any suitable radio access technology (RAT).

More specifically, as noted above, the communication system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and/or the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communication networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communication system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
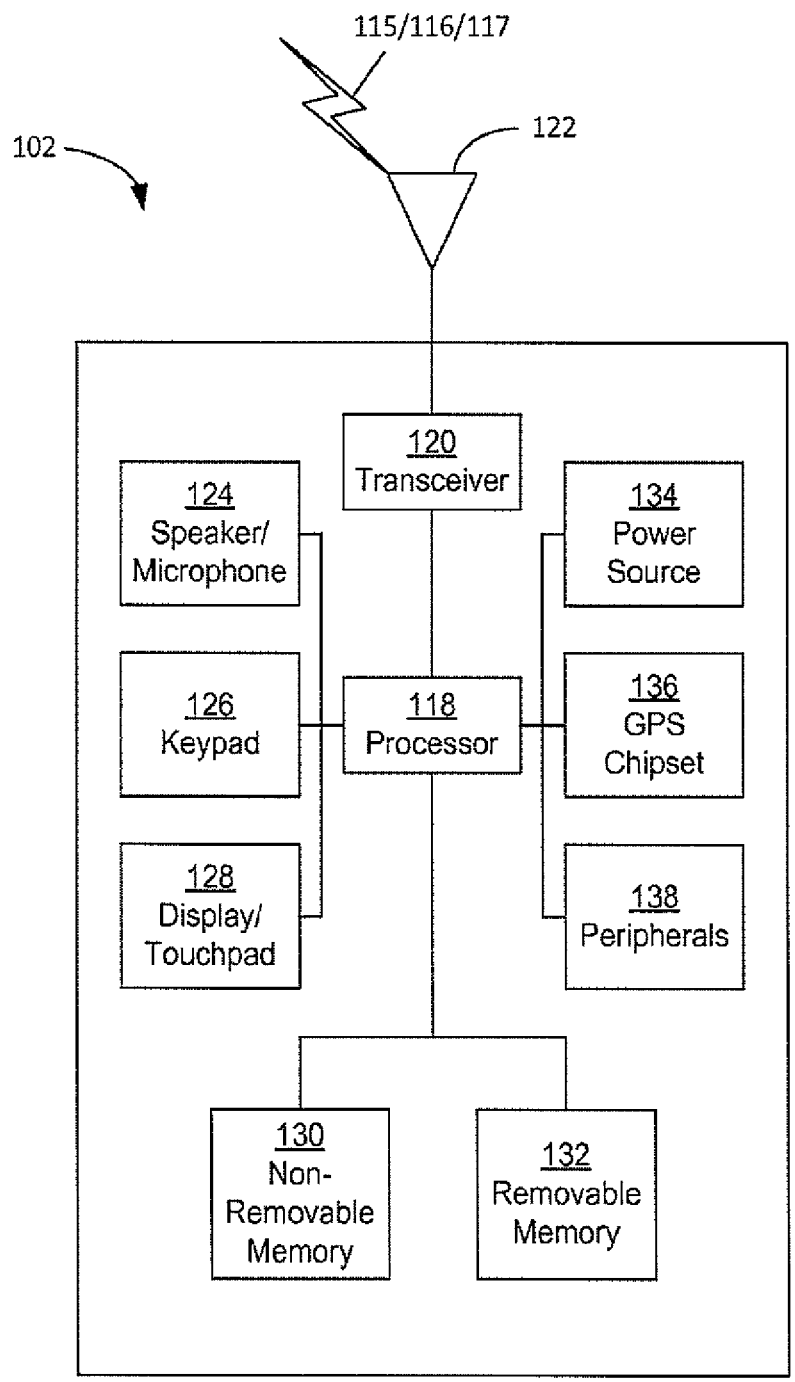
FIG. 1B is a system diagram of an example wireless transmit/receive unit (WTRU) that may be used within the communication system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNode-B), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and/or the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, and/or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and/or to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, and/or any other type of memory storage device. The removable memory 132 may include a subscriber identity module (SIM) card, a memory stick, a secure digital (SD) memory card, and/or the like. In other embodiments, the processor 118 may access information from, and/or store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 118 may be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

Figure 1C:
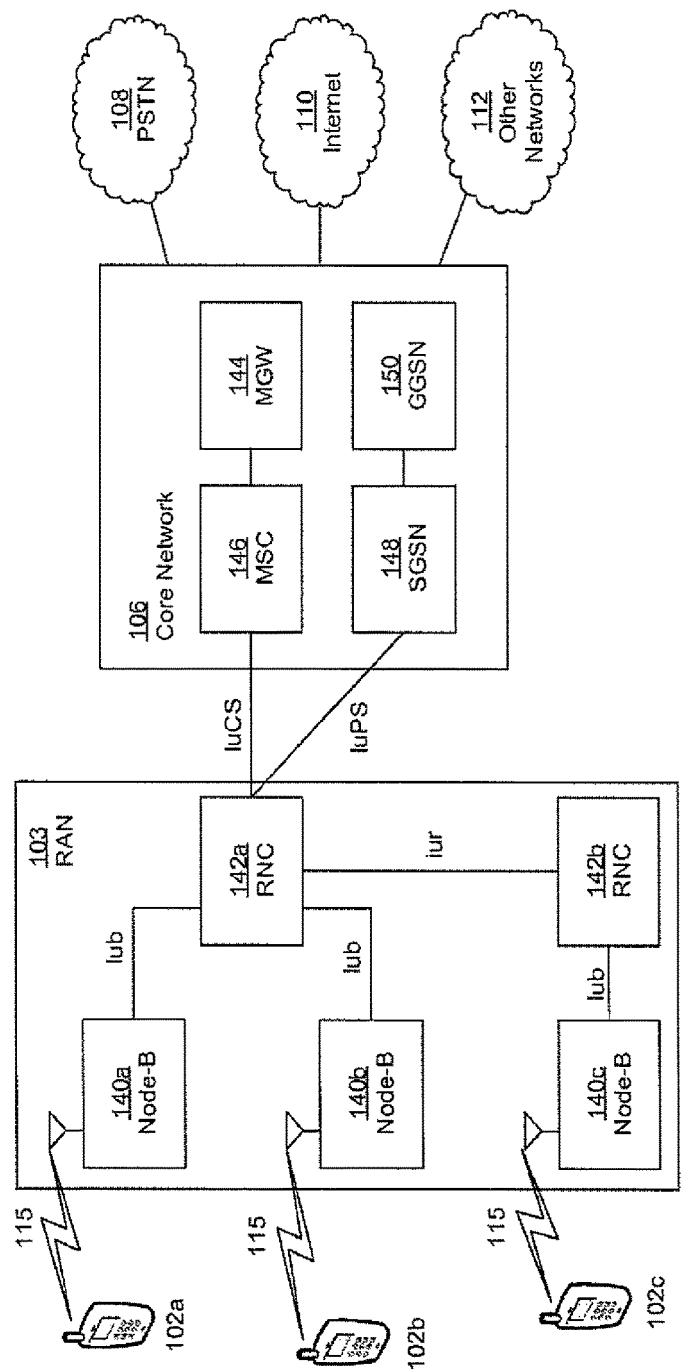
FIG. 1C is a system diagram of an example radio access network and an example core network that may be used within the communication system illustrated in FIG. 1A.

FIG. 1C is a system diagram of an example RAN 103 and core network 106. As described herein, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs.

As shown in FIG. 1C, the Node-Bs 140a, 140b may be in communication with the RNC 142a. Additionally, the Node-B 140c may be in communication with the RNC 142b. The Node Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as radio resource management, outer loop power control, load control, admission control, packet scheduling, handover control, macrodiversity, security functions, data encryption, and/or the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may be connected to the networks 112, which may include other wired or wireless networks that are owned and/or operated by other service providers.

Figure 1D:
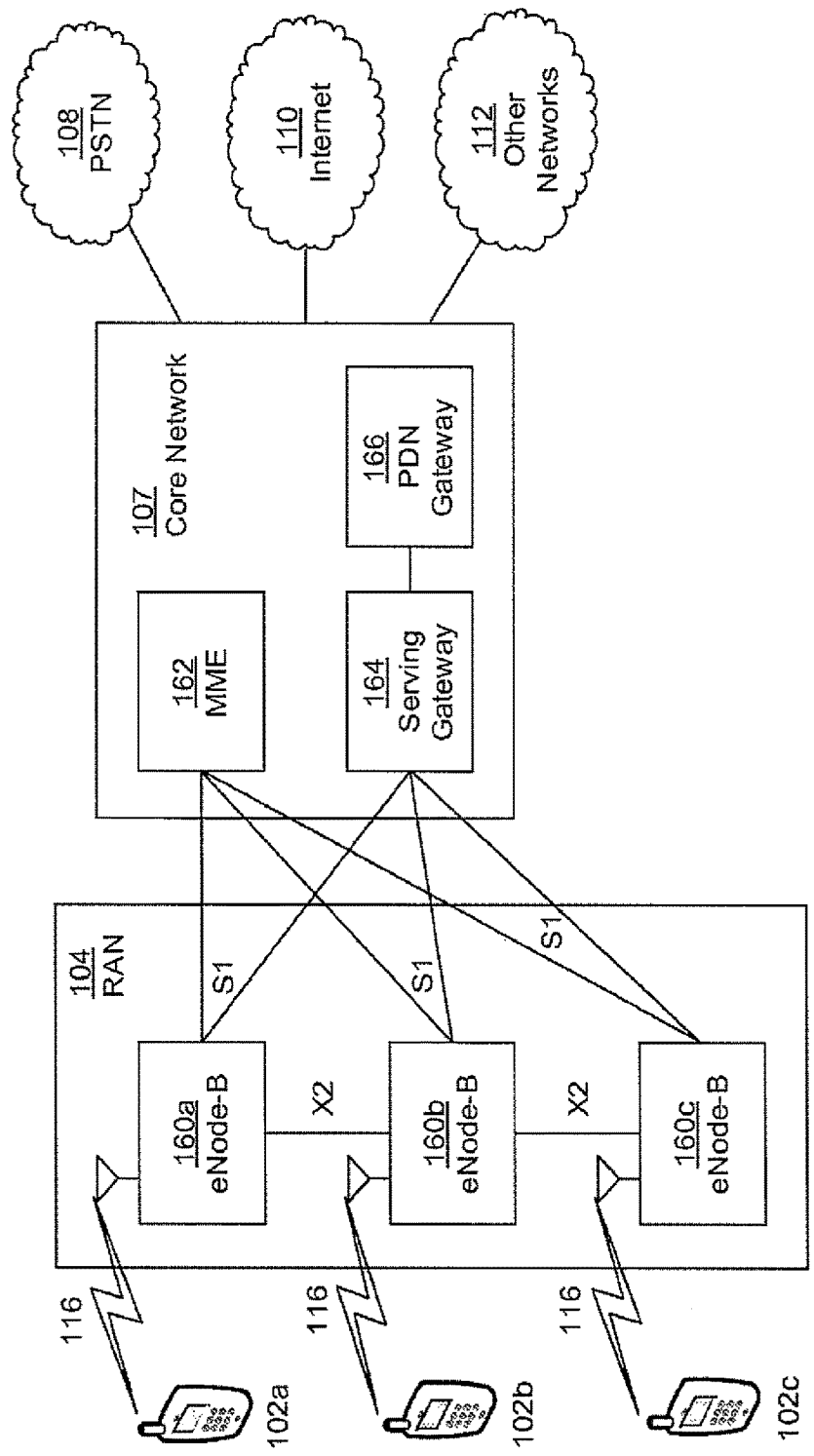
FIG. 1D is a system diagram of another example radio access network and an example core network that may be used within the communication system illustrated in FIG. 1A.

FIG. 1D is a system diagram of an example RAN 104 and core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and/or the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the SI interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and/or the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 1 12, which may include other wired or wireless networks that are owned and/or operated by other service providers.

A system diagram of an example RAN 105 and core network 109 according to an embodiment is shown. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

The RAN 105 may include base stations and an ASN gateway, though it will be appreciated that the RAN 105 may include any number of base stations and ASN gateways while remaining consistent with an embodiment. The base stations may each be associated with a particular cell in the RAN 105 and may each include one or more transceivers for communicating with the WTRUs 102a, 102b, 102c over the air interface 117. In one embodiment, the base stations may implement MIMO technology. Thus, the base station, for example, may use multiple antennas to transmit wireless signals to, and receive wireless signals from, the WTRU 102a. The base stations may also provide mobility management functions, such as handoff triggering, tunnel establishment, radio resource management, traffic classification, quality of service (QoS) policy enforcement, and/or the like. The ASN gateway may serve as a traffic aggregation point and may be responsible for paging, caching of subscriber profiles, routing to the core network 109, and/or the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations may be defined as an R8 reference point that includes protocols for facilitating WTRU handovers and the transfer of data between base stations. The communication link between the base stations and the ASN gateway may be defined as an R6 reference point. The R6 reference point may include protocols for facilitating mobility management based on mobility events associated with each of the WTRUs 102a, 102b, 102c.

The RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA), an authentication, authorization, accounting (AAA) server, and/or a gateway. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA may provide the WTRUs 102a, 102b, 102c with access to packet-switched networks, such as the Internet 110, to facilitate communications between the WTRUs 102a, 102b, 102c and IP-enabled devices. The AAA server may be responsible for user authentication and for supporting user services. The gateway may facilitate interworking with other networks. For example, the gateway may provide the WTRUs 102a, 102b, 102c with access to circuit-switched networks, such as the PSTN 108, to facilitate communications between the WTRUs 102a, 102b, 102c and traditional land-line communications devices. In addition, the gateway may provide the WTRUs 102a, 102b, 102c with access to the networks 112, which may include other wired or wireless networks that are owned and/or operated by other service providers.

It will be appreciated that the RAN 105 may be connected to other ASNs and/or the core network 109 may be connected to other core networks. The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

A wireless communication system may implement one or more nodes for performing wireless communications. A heterogeneous network (HetNet) may use macrocells and/or small cells (e.g., picocells and/or femtocells). The macro cell may overlap in service area with one or more small cells. While the examples provided herein may implement a picocell or a femtocell in an example small cell deployment, any other small cell deployment may be implemented. Small cell deployments may provide overall system capacity and/or cellular coverage gains. Deployment of picocells and/or femtocells of smaller coverage on the top of a macrocell based network may serve to reduce operating expense (OPEX) and/or capital expenditure (CAPEX). The nodes within a HetNet may have different characteristics, such as transmission power and/or coverage area. Communications within a service area may be performed in the spatial, time, and/or power domains.

The use of multiple cells within the same service area may have an impact on communications with a WTRU. Control channel communications and/or data channel communications may be impacted by the use of multiple cells within the same service area. The impact may be due to an imbalance between uplink and downlink transmissions.

A HetNet may be implemented in various types of networks, such as a High Speed Packet Access (HSPA) network for example. The HSPA air interface may be based on WCDMA technology, which may use multiple orthogonal channelization codes to facilitate multiple access for different users. The frequency reuse factor may be set to 1 in a co-channel deployment to make maximum use of the network capacity. The channelization code dimension for resource allocation may have a limited degree of freedom (e.g., 15 codes available), and/or may implement strict synchronization.

Uplink operation of HSPA (e.g., HSUPA) may be built on fast dynamic power control. Uplink functionalities, transport block size control, grant allocation, and/or network scheduling may be in terms of uplink transmit power. The communication network may be designed based on power contention.

The transmission timing of some physical channels may not be subframe aligned to others by design. For example, the HS-SCCH, which may be used to schedule downlink data, may be transmitted two slots ahead of the HS-DPSCH to support dynamic AMC and channelization code selection. Due to overlaid co-channel deployment of multiple cells of different sizes in the same coverage area, the interference in uplink and/or downlink may become complex for HSPA HetNet deployment.

Figure 2:
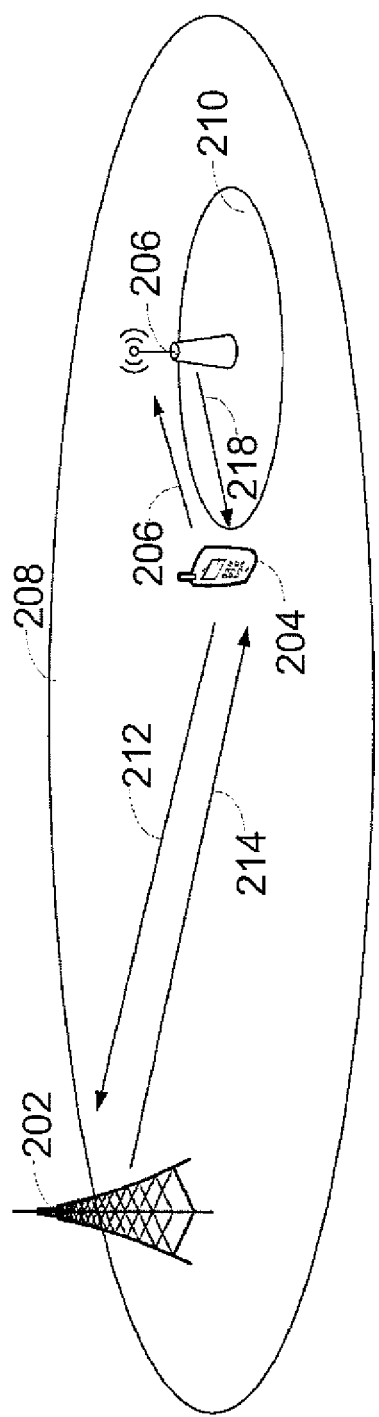
FIG. 2 is a diagram that depicts another example communication environment for performing communications using a HetNet.

FIG. 2 is a diagram that depicts an example communication environment for performing communications in a HetNet. The example communication environment may be implemented to avoid interference. As shown in FIG. 2, a WTRU 204 may perform communications with a macrocell 202 when at or within a service area 208. The WTRU 204 may receive information, such as user requested data and power control commands, from the macrocell 202 via a downlink communication channel 214. The WTRU 204 may receive information on the downlink communication channel 214 when the macrocell 202 is the serving cell or non-serving cell. The downlink communication channel 214 may include an HS-DSCH, such as an HS-PDSCH, a High Speed Shared Control Channel (HS-SCCH), a Fractional Dedicated Physical Channel (F-DPCH) or DPDCH, an Enhanced Absolute Grant Channel (E-AGCH), an Enhanced HARQ Acknowledgement Indicator Channel (E-HICH), an Enhanced Relative Grant Channel (E-RGCH), or other downlink communication channel. The WTRU 204 may communicate with the macrocell 202 via the uplink communication channel 212. The uplink communication channel 212 may include an HS-DPCCH, an E-DPCCH/E-DPDCH, a DPDCH, a DPCCH, an S-DPCCH, an S-E-DPDCH, an S-E-DPCCH when uplink closed loop transmit diversity (UL CLTD) or uplink multiple input multiple output (UL MIMO) is implemented, or other uplink communication channel, e.g. a control channel for communicating control information, such as acknowledgment information and/or channel quality information for the downlink communication channel 214.

The WTRU 204 may communicate with a picocell 206 when at or within a service area 210. The WTRU 204 may receive information, such as user requested data and/or power control commands, from the picocell 206 via a downlink communication channel 218. The WTRU 204 may receive information on the downlink communication channel 218 when the picocell 206 is the serving cell or non-serving cell. The downlink communication channel 218 may include an HS-DSCH, such as an HS-PDSCH, an HS-SCCH, an F-DPCH or DPDCH, an E-AGCH, an E-HICH, an E-RGCH, or other downlink communication channel. The WTRU 604 may send information to the picocell 206 via an uplink communication channel 616. The uplink communication channel 216 may include an HS-DPCCH, an E-DPCCH/E-DPDCH, a DPDCH, a DPCCH, an S-DPCCH, an S-E-DPDCH, an S-E-DPCCH when UL-CLTD or UL MIMO is implemented, or other uplink communication channel. The picocell 206 may be implemented in an area that may be overlaid with the service area 208 of the macrocell 202.

The WTRU 204 may dynamically control the uplink communication channel on the basis of power control commands from one or more BSs such that communication channel transmission power may be individually power controlled. The WTRU may maintain an active set of BSs comprising at least one serving cell and at least one non-serving cell. The WTRU listens to power control commands from the cells in the active set. The power control commands may comprise information on absolute transmission power and/or relative transmission power allowed for the WTRU. The individual power control on the uplink communication channel may increase, e.g. increase success, of control channel reception at the intended receiving cell. The power control may be implemented dynamically to change according to channel changes for the WTRU 204. The changes may comprise for example changes in received power at the cell due to changes in channel gain of the communications channel. The macrocell 202 may send the dynamic power control instructions to the WTRU 204 on the downlink communication channel 214. The dynamic power control instructions may be based on measurements taken by the WTRU 204. The picocell 202 may send similar dynamic power control instructions on the downlink communication channel 218.

Figure 3:
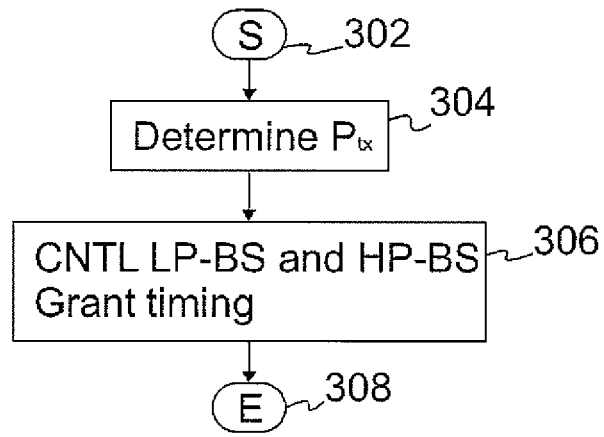
FIG. 3 illustrates a method for controlling transmission power of WTRU according to an embodiment.

FIG. 3 illustrates a method for controlling transmission power of WTRU according to an embodiment. The method may be performed in a network element or a WTRU of a communications system, for example the communications systems described in FIGS. 1A and 1C to 1D. Preferably, the method is performed by at least two, i.e. two, three, four, five or more, network elements, e.g. base stations that are capable of communicating with the WTRU, when the WTRU is within their service areas. The method may start 302, when the network element is switched on and operational such that it may receive and communicate information with the WTRU. The information may comprise information related to radio resource management in the communications network, for example information comprising at least one from a group comprising: types of base stations communicating with the WTRU, WTRU uplink signal quality, power control command history and information on the received signal strength and their combination.

In 304, an allowed transmission power $P_{tx}$ of the WTRU for communicating with a Low Power Base Station (LP-BS) and a High Power Base Station (HP-BS) may be determined. The allowed transmission power may be determined to at least one of the base stations. An allowed transmission power may be determined for each base station separately. Information on received signal strength of the WTRU may be obtained for example by measurements performed by the WTRU for determining the allowed transmission power for the WTRU. In this way the interference caused by the transmissions may be controlled per base station. The measurements may be performed by the base stations for each WTRU they are communicating with.

The allowed transmission power level may be referred to as an Absolute Grant (AG). The AG may be sent to the WTRU on a downlink communications channel, for example an E-AGCH. The AG may indicate an absolute number for a Serving Grant (SG) of the WTRU. The WTRU maintains the SG that specifies the maximum power the WTRU can use on an uplink communications channel, for example, the E-DPDCH. The SG may be specified per a transmission time interval (TTI), e.g. for a time period of 2 ms.

In an embodiment an allowed transmission power defined by a LP-BS is lower than an allowed transmission power defined by a HP-BS. This is a typical situation for the HP-BS and LP-BS communicating with the WTRU since the LP-BS service area of the LP-BS is smaller than the service area of the HP-BS.

In an embodiment LP-BS and the HP-BS belong to an active set of the WTRU. The BSs in the active set of the WTRU receive signals from the WTRU. The received signals at the BSs may be combined for achieving diversity gain, e.g. Macrodiversity gain, in the communications. The active set may comprise one or more serving cells and one or more non-serving cells. The cells may be provided by the same BS or by different BSs.

A threshold may be defined for a difference of allowed transmission powers for the WTRU to different base stations, e.g. the allowed transmission power to the LP-BS and the allowed transmission power to the HP-BS. In one example the threshold may be set to 10 dB.

In 306, timing of relative power control commands from the low power base station and the high power base station are adjusted such that a transmission rate of the relative power control commands from at least one of the LP-BS and the HP-BS is changed. The changing may comprise equalizing the transmission rates of the relative power control commands from the LP-BS and the HP-BS. The transmission rates may be equalized when the difference of the allowed transmission powers meets the defined threshold. The relative power control commands may be transmitted at the equalized transmission rates. The transmission rates may be equalized by adjusting the transmission rate of one or more of the base stations the WTRU is communicating with. After equalization, the transmission rates of the relative power control commands from the base stations are substantially the same, have substantially the same transmission time and/or a difference of the transmission rates is reduced. The threshold may be defined such that the transmission rates of the relative power control commands are adjusted, when the allowed transmission power to the LP-BS is substantially different than the allowed transmission power to the HP-BS, i.e. lower or equal than the defined threshold. Power control information, for example relative power control commands and/or information indicating that the difference of the allowed transmission power levels meets a threshold may be communicated between the WTRU and the base stations. The relative power control commands may be caused to be transmitted on the basis of the information from the WTRU indicating that the threshold is met.

The LP-BS may have an initial transmission rate of 1/(10 ms) for relative power control commands, and an HP-BS may have an initial transmission rate of 1/(2 ms) for relative power control commands. The transmission rates may be equalized on the basis of the difference of the allowed transmission powers. The equalized transmission rates of the relative power control commands from the LP-BS and the HP-BS may be substantially the same time, for example the same TTI, or they may have different transmission times, TTIs, or at least a difference of the rates is reduced compared with the transmission rates prior to equalization.

In an embodiment, the transmission rates and the transmission times of the relative power control commands may be adjusted such that the relative power control commands are caused to be transmitted substantially at the same time and rate.

A relative power control command, i.e. a Relative Grant (RG), defines a relative adjustment, increasing, decreasing or maintaining, of the allowed transmission power of the WTRU. The timing of the power control commands from both the LP-BS and the HP-BS may be assigned to the same TTI or to different TTIs such that the LP-BS and HP-BS transmit the power control commands substantially at the same rate. Accordingly, the HP-BS and the LP-BS are preferably synchronized. In an active set of the WTRU, all the power control commands from all the BSs may be scheduled to be transmitted substantially at the same rate. The timing of the power control commands provides that the power control commands from the BSs are received at the WTRU and are at the disposal of the WTRU for controlling the transmission power towards the BSs.

In an embodiment, timing of the relative power control commands from the LP-BS and the HP-BS are adjusted. The LP-BS and the HP-BS may be configured to transmit the relative power control commands are a specific transmission rate. The adjusting of the timing of the relative power control commands may comprise adjusting the transmission rates of the LP-BS and the HP-BS. Preferably the transmission rate of the HP-BS is equalized with the transmission rate of the LP-BS such that the transmission rate of the HP-BS is not faster than the transmission rate of the LP-BS. Accordingly, when the transmission rate of the HP-BS is higher than the transmission rate of the LP-BS, the transmission rate of the HP-BS may be at least decreased towards the transmission rate of the LP-BS. The transmission rate of the HP-BS may be decreased substantially to the same transmission rate with the LP-BS.

Preferably consecutive power control commands are transmitted at least with a separation of 5 TTIs, when the TTI length is 2 ms. In this way it may be ensured that the time between the power control commands is sufficient to allow the effect of the power control commands to the transmission power of the WTRU to be observed for the following power control commands. The separation time between the power control commands allows for example the following operations to take place: (1) determining a new transmission power in the WTRU, (2) apply the new transmission power in the WTRU, measurements of received power from the WTRU (3) at the BSs and (4) determining new relative power control commands. The four steps may be performed in the TTIs between the power control commands, which are illustrated e.g. in FIG. 5.

In an embodiment the power control command is a relative power control command that defines an incremental adjustment to the SG of the WTRU. The WTRU may adjust the SG on the basis of the RG in controlling transmission power.

The RG may be a command "UP", DOWN or "HOLD" that defines adjustment of the SG. The "UP" command indicates the WTRU that the SG should be increased, the "DOWN" indicates the WTRU that the SG should be decreased and the "HOLD" command has no effect on the SG. Preferably the "UP" increases the SG by a discrete step of one, two or three that, for example approximately equal to 1 dB/step that may depend on the current SG and parameters set by higher layer signalling. Preferably the "DOWN" leads to a decrease of the SG by a discrete step of approximately 1 dB. The step size may be the same in both "UP" and "DOWN" commands.

Relative power control commands may be received by the WTRU on a control channel from each BS the WTRU is communicating with. The control channel may be an Enhanced Relative Grant Channel (E-RGCH), for example.

The BSs may be in the active set of the WTRU. Each cell in the active set may transmit a relative power control command to the WTRU. Cells controlled by the same BS may send the same relative power control command.

The WTRU may receive the power control commands and update the SG on the basis of the received power control commands. In an example, the power control commands are received from all non-serving BSs in the active set and may be combined with each other. The combination may use the following logic: if at least one command is "DOWN", the combined command is "DOWN" and only if all commands are "HOLD", the combined command is "HOLD".

Application of the "DOWN" command may lead also to a decrease of the SG by one step and to a prohibition to increase the SG for a defined period of time, e.g. the next 8 TTIs. Power control commands from serving BSs maybe combined to the power control commands from the non-serving BSs using the following logic: "DOWN" command from the serving BS may be combined with the non-serving "DOWN" command resulting in the grant decrease by two steps and further serving "DOWN" commands can be also applied during the above "freezing" period of 8 TTIs; the non-serving "HOLD" command has no effect on the grant, i.e. the serving relative grant command is applied without any changes; during the above "freezing" period, "UP" commands from serving BSs are ignored during those TTIs.

In 308 the method may end after the transmission rates of the relative power control commands have been adjusted, whereby the transmission power of the WTRU may be controlled such that interference to the LP-BS may be kept low.

Figure 4:
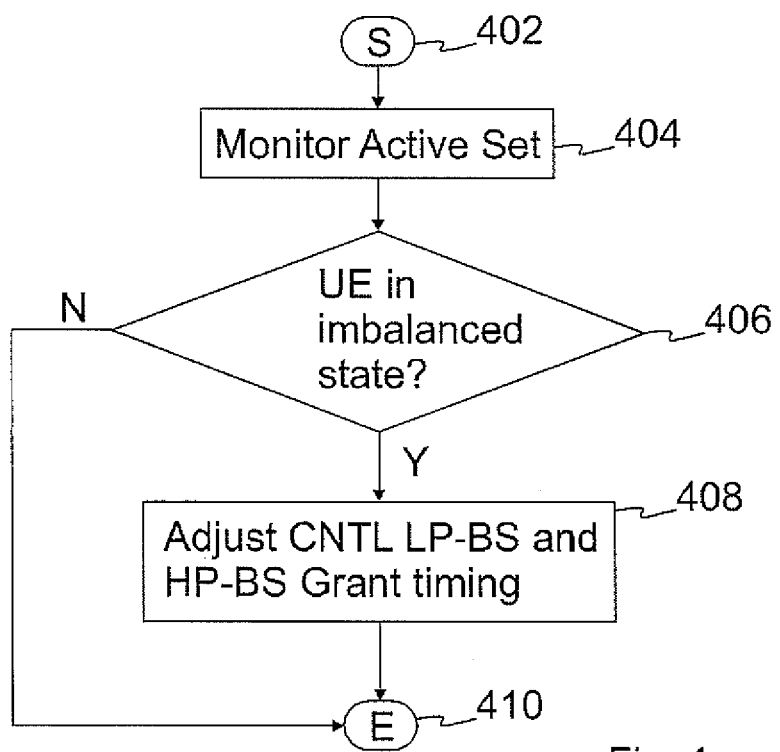
FIG. 4 illustrates a method for controlling transmission power of WTRU in balanced and imbalanced states according to an embodiment.

FIG. 4 illustrates a method for controlling transmission power of WTRU in balanced and imbalanced states according to an embodiment. The method provides different timing for power control commands in the balanced and imbalanced states of the WTRU. In this way interference caused by the WTRU may be kept low in the BSs the WTRU is communicating with. Particularly, the interference caused by the WTRU may be kept low, when WTRU controls the transmission power based on power control commands from both an LP-BS and an HP-BS. The power control commands may be as described above. The method may be performed in a WTRU or a network element of a communications system, for example the communications systems described in FIGS. 1A and 1C to 1D.

The method may start in 402, when the WTRU is communicating with the LP-BS and the HP-BS. The LP-BS and the HP-BS may be in the active set of the WTRU as explained above. The HP-BS may be a serving BS and the LP-BS may be a non-serving BS.

In 404, the active set is monitored. The monitoring may comprise obtaining information on BSs that are communicating with the WTRU, WTRU uplink signal quality, received signal strength from the WTRU and power control commands to the WTRU. The information on BSs may comprise identifiers that identify the type of the BSs as a LP-BS or a HP-BS. The information on WTRU uplink signal quality may comprise Signal-to-Interference and Noise Ratio (SINR) and/or uplink pathloss. The information on power control commands may comprise power control command history information comprising e.g. a number of sequential "UP" commands during a predefined period. Also other commands than "UP" may be monitored. The information on the received signal strength may comprise the actual measured received signal strength and/or the target signal strength.

In 406 a timing to be applied to relative power control commands from the LP-BS and the HP-BS may be determined. The timing may be determined on the basis of the information obtained by the monitoring 404 indicating whether the WTRU is in an imbalanced state or not. The imbalanced state comprises a state, where the transmission power level of the WTRU allowed by the LP-BS is substantially different, lower, than the transmission power level allowed by the high power base station, similar to described in step 306 in FIG. 3.

In various embodiments, transmission rates of the relative power control commands from the LP-BS and the HP-BS may comprise different transmission rates for each base station. The transmission rates of the relative power control commands from the LP-BS and the HP-BS may be equalized, when the WTRU is in the imbalanced state. When the WTRU is in the balanced state the transmission rates may be adjusted to initial transmission rates, prior to the imbalance. For equalization, it may be sufficient to change only the transmission rate of one of the base stations, but it is possible to change the transmission rate of all the base stations.

In an embodiment relative power control commands may be transmitted from a base station using at least two different transmission rates. The transmission rates may comprise a low transmission rate and a high transmission rate. One of the transmission rates may be used, when a balanced state of the user equipment is determined. One of the transmission rates may be used, when an imbalanced state of the user equipment is determined. The transmission rate used in the balanced state may be referred to as an initial or default transmission rate in various embodiments herein.

In an embodiment, in the balanced state, the transmission rate of the HP-BS may be determined as the high transmission rate from at least two transmission rates comprising a low transmission rate and a high transmission rate. In the imbalanced state the transmission rate of the HP-BS may be determined as the low transmission rate from the at least two transmission rates.

A high transmission rate may be for example a transmission rate of 1/TTI. A low transmission rate may be for example a transmission rate of 1/(5*TTI). The TTI may be for example 2 ms. Preferably, the low transmission rate is used in the imbalanced state.

Preferably, the low transmission rate of the HP-BS is closer to the transmission rate of the relative power control commands from the LP-BS than the high transmission rate of the HP-BS.

Figure 5:
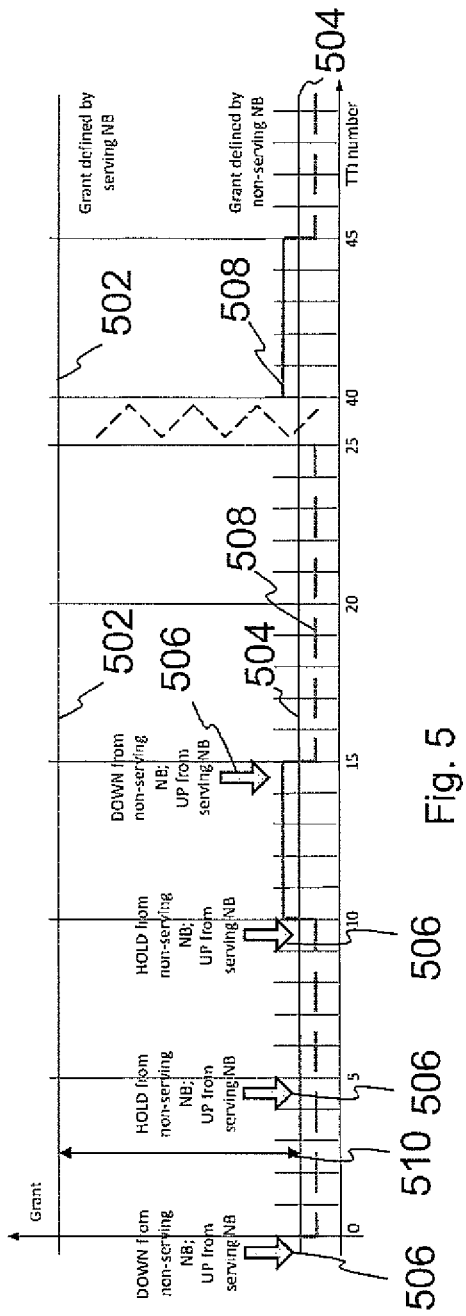
FIG. 5 illustrates relative power control commands from a low power base station and a high power base station, according to an embodiment.

Studies have shown that interference experienced by the LP-BS may be particularly reduced by various embodiments described herein, when the difference of the allowed transmission powers of the BSs is 10 dB or more. FIG. 5 illustrates examples of the allowed transmission power levels of the LP-BS and the HP-BS.

Figure 6:
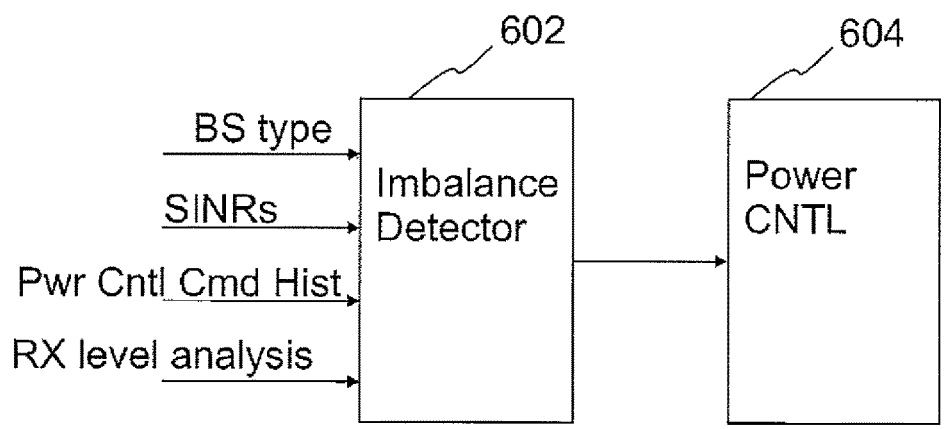
FIG. 6 illustrates functional blocks for controlling transmission power of WTRU based on monitoring BSs communicating with the WTRU, according to an embodiment.

The determining of the imbalanced state is now explained with reference to FIG. 6 that illustrates functional blocks for controlling transmission power of WTRU based on monitoring BSs communicating with the WTRU, according to an embodiment. An imbalance detector 602 may be implemented in a base station or the functionality of the imbalance detector may also be divided between a base station and another network element, for example an RNC, of the communications network. The imbalance detector may communicate with a power controller unit 604 that controls transmission power of the WTRU. The power controller unit 604 may determine a power control command on the basis of the information of the imbalance detector indicating an imbalanced state of the WTRU. The power control unit causes transmission of the determined power control command to the WTRU. The power control command may be determined specific to each BS, for example by a power control unit being implemented in each BS.

In an embodiment the imbalance detector and the power controller may be implemented in the WTRU and/or the WTRU and an element of the communications network, for example the base station. In this way the WTRU may detect the imbalance and communicate power control information indicating the imbalance and/or a power control command to the network element implementing the power control unit such that transmission of the power control command to the WTRU is caused.

The imbalance detector 602 obtains information of the BSs communicating with the WTRU, WTRU uplink signal quality to the BSs, power control command history information and information on the received signal strength as described in step 404 above. The imbalance detector may operate continuously to determine whether the WTRU is in an imbalanced state or not. The information may be obtained by the imbalance detector as part of received signal strength and/or quality measurements of the WTRU. The BS type may be obtained from configuration information of the BS e.g. a connection to an Operations and Maintenance (OM) of the BS.

In an embodiment, the imbalance may be determined on the basis of the obtained information indicating that the BSs include at least one LP-BS and at least HP-BS.

Alternatively or additionally, the imbalanced state may be determined on the basis of the obtained information indicating a large difference between the SINRs of the received uplink signal from the WTRU at the HP-BS and LP-BS. A large difference may indicate that the WTRU is in the imbalanced state. RNC may receive SINR reports from both the LP-BS and the HP-BS and determine a difference of the SINRs. A threshold may be set to the difference such that the imbalanced state of the WTRU is determined, when the threshold is met. The RNC may send information to the HP-BS and/or the LP-BS for indicating whether the WTRU is in the imbalanced or balanced state.

Alternatively or additionally, the imbalanced state may be determined on the basis of the obtained information indicating that multiple "UP" commands are sent in a sequence within a predefined time period. The time period may be defined in TTIs, for example 3 TTIs, when power control commands are sent by the HP-BS in every TTI. On the other hand, the WTRU can be considered as not being in the imbalanced state anymore if the HP-BS generates any other power control command except for "UP". A potential benefit of this approach is a possibility to dynamically enable and disable the proposed mode with an increased grant period.

Alternatively or additionally, the imbalanced state may be determined on the basis of the obtained information indicating that the received signal strength of the WTRU below a target received signal strength at the HP-BS for a predefined time period. The difference between the received signal strength and the target signal strength may be measured and evaluated against a threshold value for determining the imbalanced state of the WTRU. The WTRU may be considered as not being in the imbalanced state any more if the actual measured level becomes equal to or higher than the target.

It should be appreciated that measurements of the uplink signal strength of the WTRU may be performed at each BS as necessary to obtain the signal strength and/or signal quality information to be used in various embodiments.

Referring now back to FIG. 4, if the WTRU is in imbalanced state, the method proceeds to 408, where the timing of power control commands from the LP-BS and the HP-BS may be adjusted as described with step 306 in FIG. 3.

If the WTRU is not in the imbalanced state, the WTRU is in a balanced state and the transmission powers allowed by the base stations are substantially the same, for example the transmission powers have less than 10 dB difference. Then, the method may proceed to 410, where relative power control commands from the HP-BS may be transmitted more often than from the LP-BS. Accordingly, in the balanced state, the transmission rate of the relative power control commands from the HP-BS may be higher than the transmission rate for the relative power control commands from the LP-BS. In one example the power control commands from the HP-BS are transmitted in every TTI and the relative power control commands from the LP-BS are transmitted in every $5^{th}$ TTI. In this way, the transmission power of the WTRU may be adapted to channel conditions between the WTRU and the HP-BS faster. Preferably the HP-BS is a serving BS such that the transmission power between the WTRU and the serving BS may be adapted efficiently to changing channel conditions.

The method ends in 410, after the timing of the power control commands for the WTRU communicating with the LP-BS and the HP-BS have been adjusted.

FIG. 5 illustrates relative power control commands from a low power base station and a high power base station, according to an embodiment. In the illustration transmission rates of the relative power control commands are equalized and transmitted to the WTRU from all the BSs substantially at the same rate and substantially at the same time, for example as a result of execution of the method according to an embodiment. It should be appreciated that in various embodiments the power control commands may be transmitted substantially at the same time and/or at the same rate.

The WTRU may be communicating with both the LP-BS and the HP-BS. The LP-BS may have defined for the WTRU an AG 504 and the HP-BS may have defined for the WTRU an AG 502. The AGs have a difference 510 that exceed a threshold for the difference that may be defined as described above in connection with the description of FIG. 3. The WTRU maintains an SG 508 on the basis of relative power control commands 506 from the LP-BS and HP-BS. The relative power control commands 506 are received by the WTRU from the LP-BS and the HP-BS at the same time, i.e. every 5th TTI in the illustration. In the FIG. 5, power control commands are received from both the LP-BS and the HP-BS at TTIs −1, 4, 9 and 14. The power control commands at TTI −1 are "DOWN" from the LP-BS and "UP" from the HP-BS. The power control commands at TTI 4 are "HOLD" from the LP-BS and "UP" from the BP-BS. The power control commands at TTI 10 are "HOLD" from the LP-BS and "UP" from the HP-BS. The power control commands at TTI 14 are "DOWN" from the LP-BS and "UP" from the HP-BS. The WTRU applies the "freezing period" in the transmission power control whereby the power control commands at TTI 4 are combined such that the "UP" does not cause an increase of the transmission power. In TTI 9, the "freezing period" is passed and the power control commands are combined such that the transmission power is determined to increase by one step. The power control commands at TTI 14 are combined such that the transmission power is determined to decrease by one step. Since the relative power control commands are transmitted from the BSs at the same time with sufficient time interval after the previous power control commands, the LP-BS may measure and determine the next power control command on the basis of the changed transmission power of the WTRU. This is illustrated in the power control commands in TTI 9 and TTI 14 that cause the allowed transmission power of the WTRU between TTIs 10 and 15 to be above the AG of the LP-BS, which means the WTRU causes interference to the LP-BS. However, the power control commands in TTI 14 provide that the transmission power of the WTRU may be decreased to a level below the AG of the LP-BS. Accordingly, when the power control commands to the WTRU are transmitted at the same time from the BSs, the WTRU may determine a new transmission power, that is adjusted with respect to the current transmission power such that interference in the BSs may be reduced. On the other hand if power control commands were received more frequently, from the BSs, at least from the HP-ES, the WTRU could receive several "UP" commands from the HP-BS which would increase the transmission power of the WTRU with several steps, before the LP-BS could react to the increased transmission power control and issue a "DOWN" command to decrease the transmission power level of the WTRU towards the AG of the LP-BS.

It should be appreciated that although various embodiments herein refer to low power BS and high power BS, the embodiments may be applied to BSs and cells in general controlled by the BSs. High and low power BSs are particularly prone to imbalanced states of WTRUs, since the LP-BSs are typically located near to the WTRU, whereas the HP-BSs are far from the WTRU, whereby the channel gain to the LP-BS is higher than the channel gain to the high power BS and the transmission power of the WTRU is received at a higher level at the LP-BS than at the high power BS. Thereby, a transmission power of the WTRU adjusted for efficient transmission to the HP-BS causes interference at the LP-BS. The interference reduces the SINR of other WTRUs served by the LP-BS.

Figure 7:
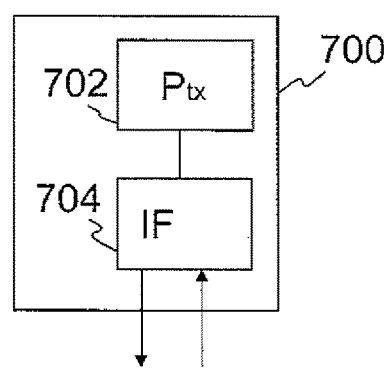
FIG. 7 illustrates a block diagram of an apparatus for performing transmission power control according to an embodiment.

FIG. 7 illustrates a block diagram of an apparatus 700 for performing transmission power control according to an embodiment. The apparatus may be a network element in a communications system described in FIGS. 1A and 1C to 1D, or a hardware or software module that may communicate with the network element. Functional blocks illustrated in FIG. 6 may be implemented by the blocks of the apparatus 700. In an embodiment the apparatus is a base station, user equipment or a module of the base station or a module of the user equipment. The apparatus comprises a power control unit 702 for controlling transmission power of WTRU communicating with a low power base station and a high power base station and an interface unit 704 for communicating power control information between the WTRU and LP-BS and the HP-BS, wherein the power control unit is operatively connected to the interface unit and arranged to cause determining allowed transmission power for the user equipment to a first base station of the at least two base stations, defining a threshold for a difference of the determined allowed transmission power to an allowed transmission power for the user equipment to a second base station of the at least two base stations, determining whether the determined allowed transmission power to the first base station meets the defined threshold, and causing to change a transmission rate of relative power control commands from at least one base station of the base stations, when the threshold is met. One or more functions or functional blocks described in various embodiments may be implemented by the power control unit such that execution of the functions or functional blocks may be caused. The blocks of the apparatus may be implemented by a processor and memory that are electrically connected. The memory may comprise a computer program, software, or firmware incorporated in a computer-readable medium for execution by the processor.

When the apparatus is a module of the base station or the WTRU, the interface unit may be connected to the processor 118 and/or transceiver 120 of the base station following the system diagram of FIG. 1B. Information, data and/or messages communicated in the communications network may be obtained by the power control unit via the interface unit.

Although features and elements are described above in particular combinations, each feature or element can be used alone or in any combination with the other features and elements. Additionally, while features and elements are described in a particular order, these features and elements are not limited to the order described. Further, the methods described herein may be implemented in a computer program, software, or firmware incorporated in a computer-readable medium for execution by a computer or processor.

An embodiment provides a computer program embodied on a distribution medium, comprising program instructions which, when loaded into an electronic apparatus, constitute the imbalance detector 602 and the power control unit 604 described earlier.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, terminal, base station, RNC, or any host computer.

The steps/points and related functions described above in FIGS. 3 and 4 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The WTRU operations and base station operations illustrate procedures that may be implemented in one or more physical or logical entities.

Apparatuses, such as base stations, WTRUs, corresponding WTRU modules or corresponding base station modules and/or other corresponding devices or apparatuses implementing the functionality of a corresponding apparatus described with an embodiment comprise not only prior art means, but also means for determining an allowed transmission power for user equipment to a first base station of at least two base stations communicating with the user equipment in a communications network, defining a threshold for a difference of the determined allowed transmission power to an allowed transmission power for the user equipment to a second base station of the at least two base stations, determining whether the determined allowed transmission power to the first base station meets the defined threshold, and causing to change a transmission rate of relative power control commands from at least one base station of the base stations, when the threshold is met. More precisely, they comprise means for implementing functionality of a corresponding apparatus described with an embodiment and they may comprise separate means for each separate function, or means may be configured to perform two or more functions. Present apparatuses comprise processors and memory that can be utilized in an embodiment. For example, the imbalance detector 602 may be a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a WTRU, base station, a corresponding WTRU module or a corresponding base station module may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
determining, by a network element in a communications network, an allowed transmission power for user equipment to a first base station of at least two base stations communicating with the user equipment in the communications network;
defining by the network element a threshold for a difference of the determined allowed transmission power to an allowed transmission power for the user equipment to a second base station of the at least two base stations;
determining by the network element whether a difference between a current allowed transmission power for the user equipment to the first base station and a current allowed transmission power for the user equipment to a second base station meets the defined threshold; and
causing by the network element a change in a transmission rate of relative power control commands from at least one base station of the first and second base stations, in response to the threshold being met.

2. The method according to claim 1, wherein the transmission rate of at least one of the base stations is caused to be decreased by the network element.

3. The method according to claim 1, wherein causing by the network element a change in a transmission rate of relative power control commands from at least one base station of the first and second base stations comprises:
  causing to transmit the relative power control commands from the base stations at equalized transmission rates.

4. The method according to claim 3, wherein equalized transmission rates comprise transmission rates with a reduced difference, transmission rates that are a same transmission rate and/or transmission times of relative power control commands from the first base station and the second base station that are a same transmission time.

5. The method according to claim 1, wherein the relative power control command defines a change of the allowed transmission power.

6. The method according to claim 1, wherein the first and second base stations respectively comprise a low power base station and a high power base station, wherein the transmission power allowed by the low power base station is lower than the allowed transmission power of the high power base station.

7. The method according to claim 1, wherein the relative power control commands are caused to transmit at most every 5th transmission time interval.

8. The method according to claim 1, comprising:
  determining a high transmission rate from at least two available transmission rates of a low transmission rate and the high transmission rate for the relative power control commands from at least one of the first and second base stations, in response to the transmission powers allowed by the first and second base stations having less than a 10 dB difference, wherein the high transmission rate is determined for the relative power control commands from a serving one of the first and second base stations.

9. The method according to claim 1, comprising:
  determining a same transmission rate should be used for the relative power control commands from the first and second base stations, in response to the transmission power allowed by the first and second base stations being different based on the threshold.

10. The method according to claim 1, wherein the first and second base stations comprise a serving base station and a non-serving base station in an active set of the user equipment.

11. The method according to claim 1, comprising:
  determining a timing to be applied to the relative power control commands on a basis of at least one from a group comprising: types of the first and second base stations communicating with the user equipment, user equipment uplink signal quality, power control command history and information on the received signal strength.

12. An apparatus comprising:
  at least one processor; and
  at least one memory including computer program code,
  the at least one memory and the computer program code configured, with the at least one processor, to cause the apparatus to perform at least the following:
  determining, by a network element in a communications network, an allowed transmission power for user equipment to a first base station of at least two base stations communicating with the user equipment in the communications network;
  defining by the network element a threshold for a difference of the determined allowed transmission power to an allowed transmission power for the user equipment to a second base station of the at least two base stations;
  determining by the network element whether a difference between a current allowed transmission power for the user equipment to the first base station and a current allowed transmission power for the user equipment to a second base station meets the defined threshold; and
  causing by the network element a change in a transmission rate of relative power control commands from at least one base station of the first and second base stations, in response to the threshold being met.

13. The apparatus according to claim 12, wherein the power control information comprises relative power control commands and/or information indicating an imbalanced state of the user equipment.

14. The apparatus according to claim 12, wherein the apparatus comprises a user equipment, a base station, or a radio network controller.

15. A computer program product comprising a non-transitory computer readable medium having computer code instructions that when loaded into a memory of an apparatus cause the apparatus to perform operations comprising:
  determining, by a network element in a communication network, an allowed transmission power for user equipment to a first base station of at least two base stations communicating with the user equipment in the communications network;
  defining by the network element a threshold for a difference of the determined allowed transmission power to an allowed transmission power for the user equipment to a second base station of the at least two base stations;
  determining by the network element whether a difference between a current allowed transmission power for the user equipment to the first base station and a current allowed transmission power for the user equipment to a second base station meets the defined threshold; and
  causing by the network element a change in a transmission rate of relative power control commands from at least one base station of the first and second base stations, in response to the threshold being met.

16. The computer program product according to claim 15, wherein the first and second base stations respectively comprise a low power base station and a high power base station, wherein the transmission power allowed by the low power base station is lower than the allowed transmission power of the high power base station.

17. The computer program product according to claim 15, wherein the computer code instructions, when loaded into the memory of the apparatus, further cause the apparatus to perform the following:
  determining a high transmission rate from at least two available transmission rates of a low transmission rate and the high transmission rate for the relative power control commands from at least one of the first and second base stations, when the transmission powers allowed by the first and second base stations have less than 10 dB difference, wherein the high transmission rate is determined for the relative power control commands from a serving one of the first and second base stations.

18. The computer program product according to claim 15, wherein the computer code instructions, when loaded into the memory of the apparatus, further cause the apparatus to perform the following:
  determining a same transmission rate should be used for the relative power control commands from the first and second base stations, in response to the transmission power allowed by the first and second base stations being different based on the threshold.

* * * * *